(12) United States Patent
Chang et al.

(10) Patent No.: US 7,616,951 B2
(45) Date of Patent: Nov. 10, 2009

(54) WIRELESS COVERAGE TESTING SYSTEM BASED ON SIMULATIONS USING RADIO RESOURCE PARAMETERS

(75) Inventors: Yuan-Lung Chang, Singapore (SG); Yuan-Huei Chang, Taipei (TW)

(73) Assignee: Zaracom Technologies Inc., Rockville, MD (US)

( * ) Notice: Subject to any disclaimer, the term of this patent is extended or adjusted under 35 U.S.C. 154(b) by 417 days.

(21) Appl. No.: 11/549,966

(22) Filed: Oct. 16, 2006

(65) Prior Publication Data
US 2008/0090582 A1    Apr. 17, 2008

(51) Int. Cl.
*H04W 24/00* (2006.01)
(52) U.S. Cl. .................. 455/424; 455/67.13; 370/241.1
(58) Field of Classification Search ............... 455/67.11, 455/67.14, 115.1, 415, 446, 455, 425, 423
See application file for complete search history.

(56) References Cited

U.S. PATENT DOCUMENTS 5,442,630 A * 8/1995 Gagliardi et al. ............ 370/402

6,201,955 B1 * 3/2001 Jasper et al. ............. 455/277.2

FOREIGN PATENT DOCUMENTS

WO PCT/US2007/077480    3/2008

* cited by examiner

*Primary Examiner*—Nick Corsaro
*Assistant Examiner*—Quan M Hua
(74) *Attorney, Agent, or Firm*—Ming Chow; Sinorica, LLC

(57) ABSTRACT

This invention uses multi-tier indexing methods to organize the wireless communication industry standard Radio Resource Management (RRM) parameters, compression techniques to compress the indexed RRM parameters, model the RRM parameters to identify the relationships between the parameters, simulate the model by eliminating predefined non-influential parameters, to conclude the signal-noise-ratio values in order to determine signal coverage. This invention is used to replace the Road Tests currently implemented by the service carriers for determining actual service coverage.

15 Claims, 4 Drawing Sheets

| BTS_ID | SNR | EQUIPPED_E | EQUIPPED_E | EQUIPPED_A | EQUIPPED_A | EQUIPPED_C | EQUIPPED_C | EQUIPPED_C |
|---|---|---|---|---|---|---|---|---|
| 10001 | 3 | 3 | 6 | 5 | | 0 | 1 | |
| 10002 | 3 | 3 | 6 | 5 | | 0 | 1 | |
| 10003 | 3 | 3 | 6 | 5 | | 0 | 1 | |
| 10004 | 3 | 3 | 6 | 5 | | 0 | 1 | |
| 10005 | 3 | 3 | 6 | 5 | | 0 | 1 | |
| 10006 | 3 | 3 | 6 | 5 | | 0 | 1 | |
| 10007 | 3 | 3 | 6 | 5 | | 0 | 1 | |
| 10008 | 3 | 3 | 6 | 5 | | 0 | 1 | |
| 10009 | 3 | 3 | 6 | 5 | | 0 | 1 | |
| 10010 | 3 | 3 | 6 | 5 | | 0 | 1 | |
| 10011 | 3 | 3 | 6 | 5 | | 0 | 1 | |
| 10012 | 3 | 3 | 6 | 5 | | 0 | 1 | |
| 10013 | 3 | 3 | 6 | 5 | | 0 | 1 | |
| 10014 | 3 | 3 | 6 | 5 | | 0 | 1 | |
| 10015 | 3 | 3 | 6 | 5 | | 0 | 1 | |
| 10016 | 3 | 3 | 6 | 5 | | 0 | 1 | |
| 10017 | 3 | 3 | 6 | 5 | | 0 | 1 | |
| 10018 | 3 | 3 | 6 | 5 | | 0 | 1 | |
| 10019 | 3 | 3 | 6 | 5 | | 0 | 1 | |
| 10020 | 3 | 3 | 6 | 5 | | 0 | 1 | |
| 10021 | 3 | 3 | 6 | 5 | | 0 | 1 | |
| 10022 | 3 | 3 | 6 | 5 | | 0 | 1 | |
| 10023 | 3 | 3 | 6 | 5 | | 0 | 1 | |
| 10024 | 3 | 3 | 6 | 5 | | 0 | 1 | |
| 10025 | 3 | 3 | 6 | 5 | | 0 | 1 | |
| 10026 | 3 | 3 | 6 | 5 | | 0 | 1 | |
| 10027 | 3 | 3 | 6 | 5 | | 0 | 1 | |
| 10028 | 3 | 3 | 6 | 5 | | 0 | 1 | |
| 10029 | 3 | 3 | 6 | 5 | | 0 | 1 | |
| 10030 | 3 | 3 | 6 | 5 | | 0 | 1 | |
| 10031 | 3 | 3 | 6 | 5 | | 0 | 1 | |

Fig. 4

WIRELESS COVERAGE TESTING SYSTEM BASED ON SIMULATIONS USING RADIO RESOURCE PARAMETERS

FIELD OF INVENTION

This invention relates to a system for measuring and ensuring wireless communications coverage at various geographic areas where the service carriers provide its communication services. The coverage of a cellular system depends on many different factors including geographical obstacles, traffic load, signal interferences, handoff, and others. Therefore, the coverage of a cellar system varies depending on different factors as mentioned previously. The current system collects and analyzes real communication traffic data for modeling and simulations to conclude the quality of signals in terms of signal-to-noise ratio (SNR) to determine its coverage.

BACKGROUND OF THE INVENTION

Signal coverage is a major service concern to all wireless communication subscribers as well as the service carriers. The subscribers have to roam from one place to another in order to obtain a better signal coverage for his desired communications. The subscriber cannot predict any location where provides expected or poor signal coverage. The system and environmental factors that affect signal coverage change dynamically through time period. The service carriers in the wireless communication industry have implemented the road tests by sending technicians out to the fields to detect and record real coverage signals. The technicians use various signal detecting equipments (i.e., cell phone, global positioning system, and personal computers) to record live signal strengths at different geographical locations. The collected signal data will be analyzed at a later time to determine the filed coverage. This road tests have been tedious, time consuming, inaccurate due to human factors, and costly tasks.

The current invention is for determining cell coverage without performing the road tests repeatedly as the service carriers perform in nowadays. This invention implements a series of indexing, modeling, and simulations on the standard Radio Resource Management (RRM) parameters that are available on the wireless communication systems. By determining the influential relationships between all of the RRM factors and in view of a baseline road test data, this invention concludes a signal-to-noise ratio (SNR) value to determine the signal coverage for a desired coverage location.

This invention will save not only costs for the service carriers to perform road tests but also improves the accuracy of determining filed signal coverage in a timely manner. The service carriers therefore can improve its service coverage in a much more efficient method.

SUMMARY OF THE INVENTION

This invention implements a series of indexing, modeling, and simulations on the RRM parameters that are available on the wireless communication systems to determine filed signal coverage.

There are five (5) modules performing various tasks of the current invention. The five modules are Definition Module, Index Module, Characterizing Module, Modeler Module, and Simulator Module.

The "Definition Module" defines the conformations and relationships between vendor-specific communication traffic data and the standard RRM parameters.

The "Index Module" indexes all RRM parameters by multiple-tier indexing methods for the efficiencies of data access and data storages.

The "Characterizing Module" defines the characteristic elements of each RRM parameter by a mathematical expression for the later modeling and simulations processes.

The "Modeler Module" sets a model by all of the RRM parameters to represent influential relationships between each other and its impact on the system coverage.

The "Simulator Module" repeats simulations by using the model that is set by the Modeler Module. The simulations eliminates RRM parameters that are unessential per predefined requirements in order to determine signal-coverage determining parameters. In view of a baseline SNR that has been established by a road test data, and the fact of the industry standards that the RRM parameters are designed to balance the system coverage, the SNR reports are therefore concluded by end of the simulations when only the essential parameters are considered.

BRIEF DESCRIPTION OF THE DRAWINGS

FIG. 4 is an example of the SNR report.

DETAIL DESCRIPTIONS OF THE INVENTION

Figure 1:
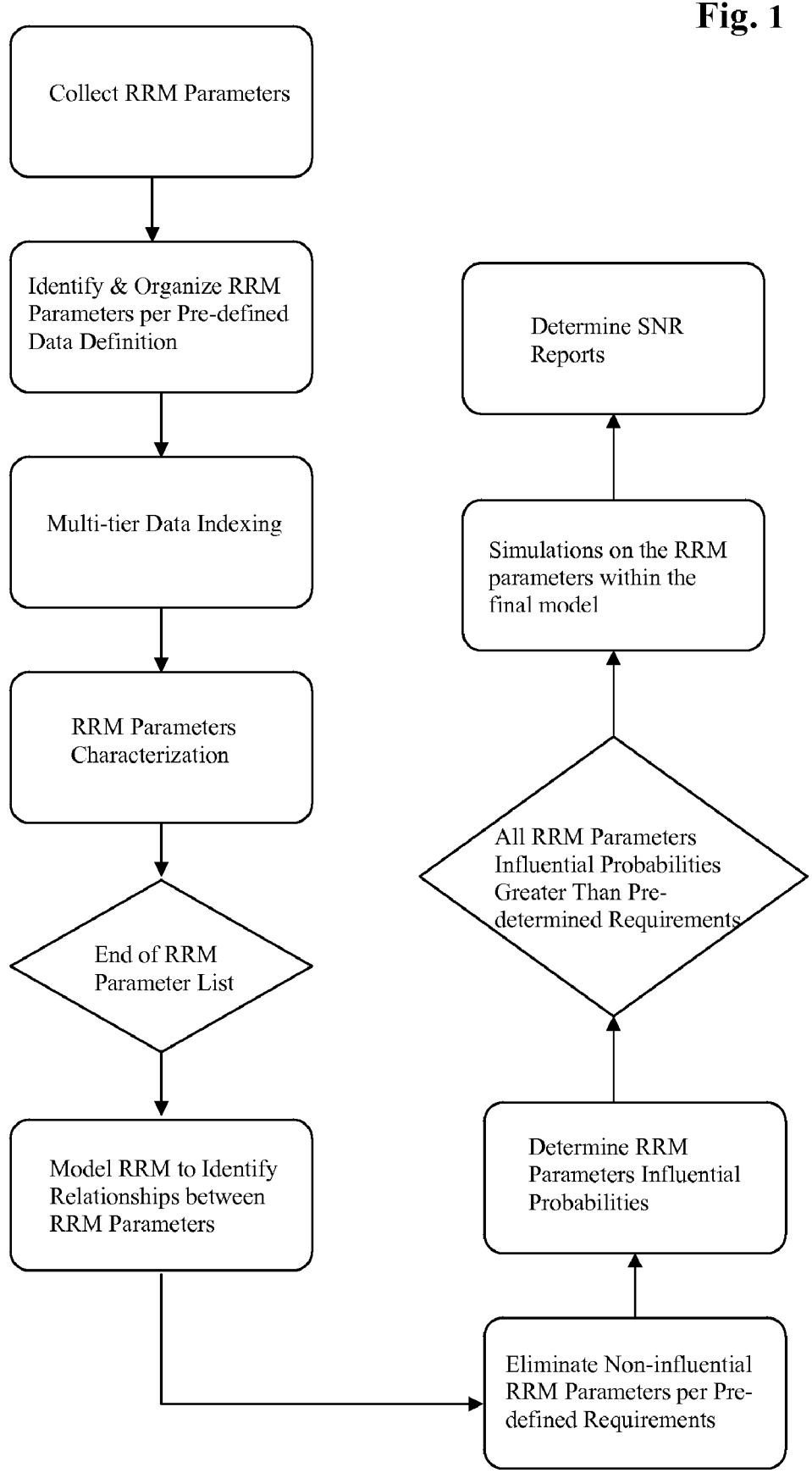
FIG. 1 is a process flow of the current invention.
Figure 2:
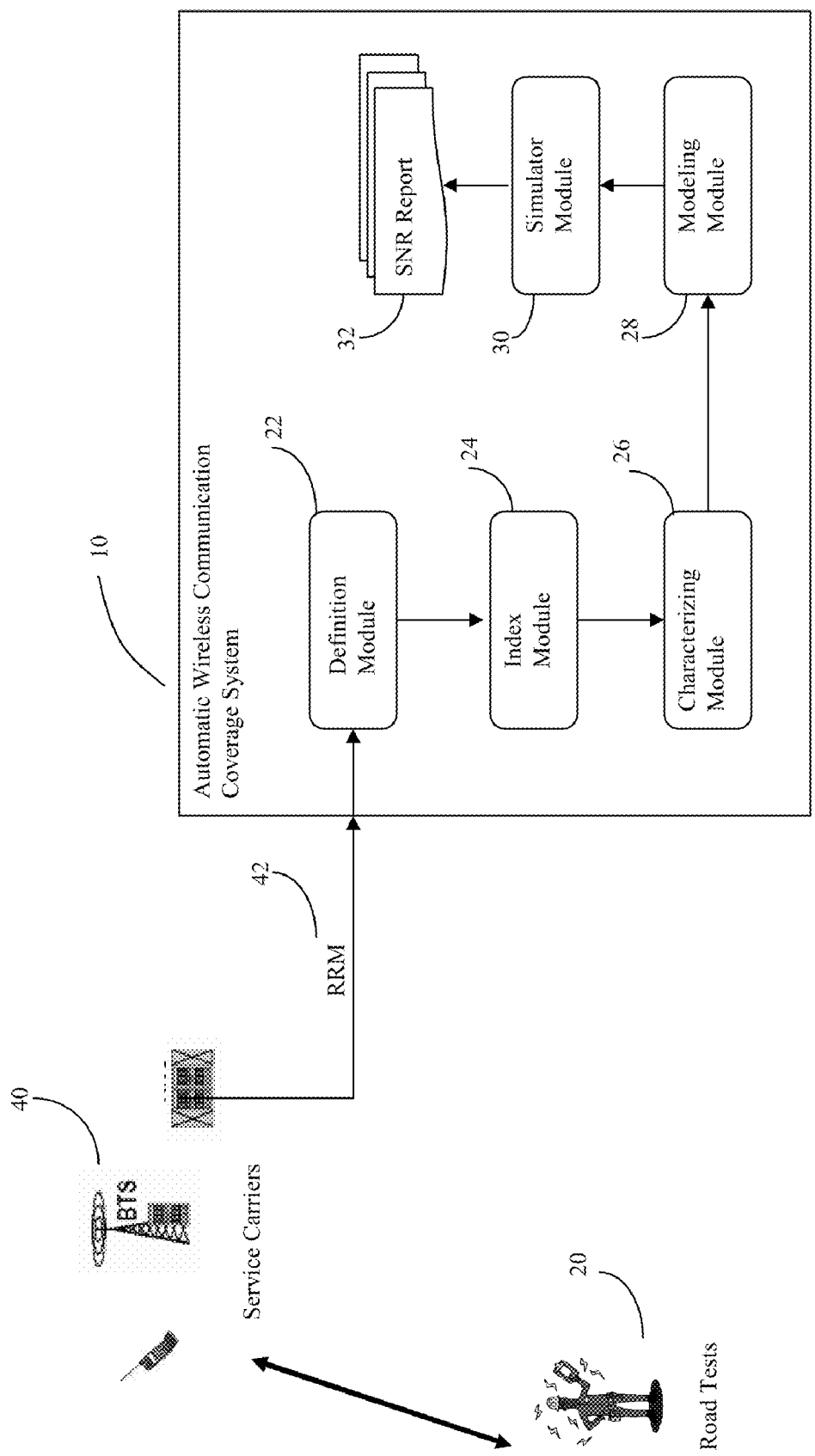
FIG. 2 is a system architecture of the current invention.
Figure 3:
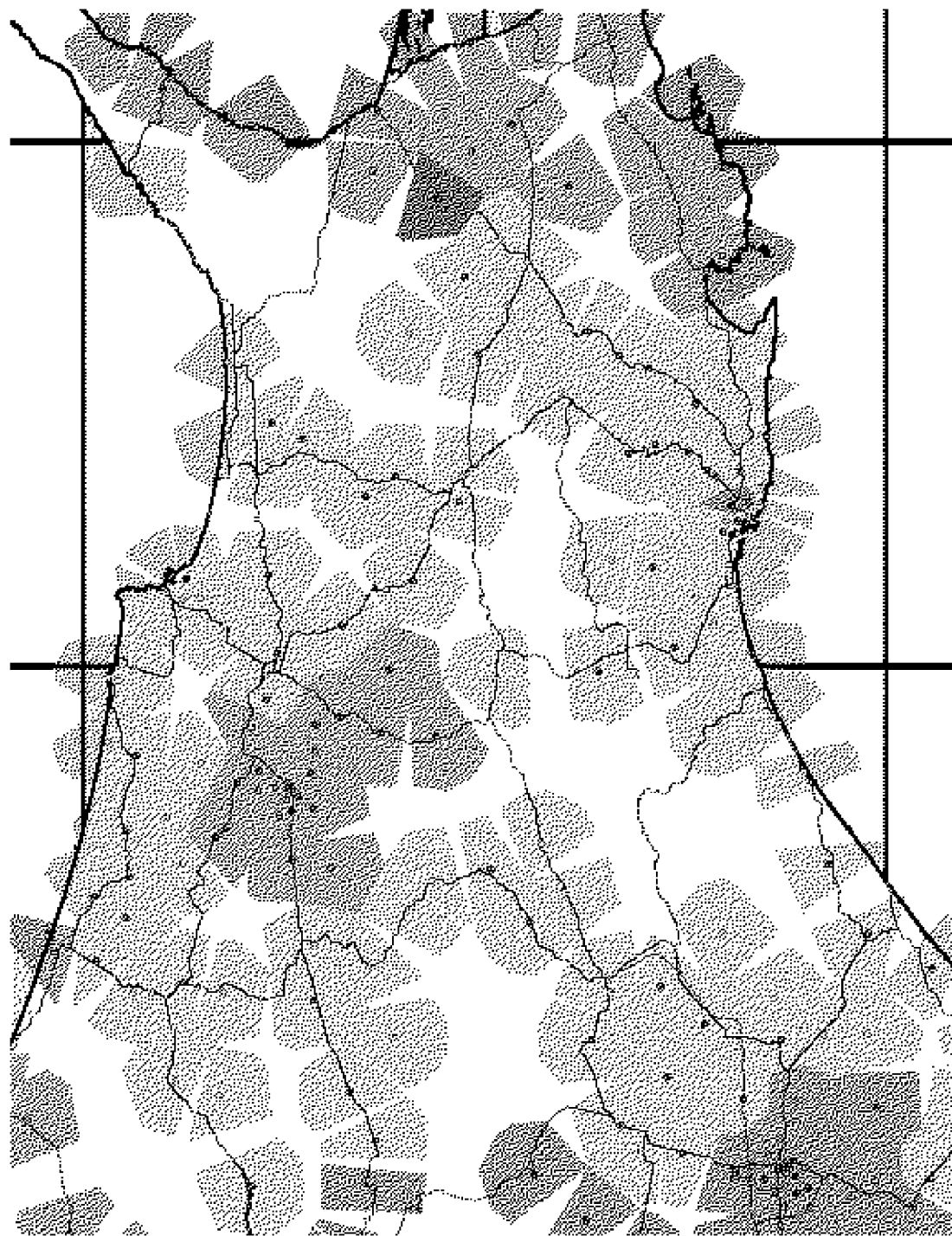
FIG. 3 is an example of the SNR report.

Terminology and Lexicography:
Multiple-Tier Indexing: Indexing on the data and its associated indices that were created by a previous tier indexing process. By the indexing, certain data storage may be saved by eliminating repeated data in order to achieve the goals of data compressions.
Radio Resource Management (RRM): The RRM refers to all RRM parameters defined by the Universal Mobile Telecommunication System (UMTS) standard, or all Selection/Distribution Unit parameters defined by the Code Division Multiple Access 2000 (CDMA2000) standard, or parameters affecting communication signal coverage that are defined by service carriers.
Modeling: A process of generating an abstract model that uses mathematical expressions to describe the behavior of a system.
Simulation: The process of creating imitative representations of a target system that is modeled by mathematical expressions.
Baseline signal-to-noise Ratio (BSNR): An SNR data collected from a road test that represent a worst coverage signal strength or an average coverage signal strength. Other SNR data that is collected from a road test can also be used as a baseline SNR at the invention operator's choice.
R-Tree Indexing: Tree data structures used for spatial access methods i.e., for indexing multi-dimensional information; for example, the (X, Y) coordinates of geographical data. The data structure splits space with hierarchically nested, and possibly overlapping, boxes. Each node of an R-tree has a variable number of entries (up to some pre-defined maximum). Each entry within a non-leaf node stores two pieces of data; a way of identifying a child node, and the bounding box of all entries within this child node.
Move-To-Front (MTF) indexing: The MTF indexing is an encoding of data (typically a stream of bytes) designed to improve the performance of entropy encoding techniques of compression. Each byte value is encoded by its index in a list, which changes over the course of the algorithm. The list is initially in order by byte value (0, 1, 2, 3, ..., 255). Therefore, the first byte is always encoded by its own value. After encoding a byte, that value is moved to the front of the list before continuing to the next byte.

Run-length Indexing: Run-length encoding is a form of data compression in which runs of data (that is, sequences in which the same data value occurs in many consecutive data elements) are stored as a single data value and count, rather than as the original run.

Huffman Indexing: Huffman coding is an entropy encoding algorithm used for lossless data compression. The term refers to the use of a variable-length code table for encoding a source symbol (such as a character in a file) where the variable-length code table has been derived in a particular way based on the estimated probability of occurrence for each possible value of the source symbol.

Modeling: A process of generating an abstract model that uses mathematical language to describe the behavior of a system.

Signal-to-noise ratio (SNR): an electrical engineering concept defined as the ratio of a given transmitted signal to the background noise of the transmission medium.

Indexing: A method of applying an integer and a symbol to identify an array element, or a data structure which enables fast lookup According to the wireless communication standards, for example, but not limited to the Universal Mobil Telecommunication System (UMTS) and Code Division Multiple Access 2000 (CDMA2000), RRM parameters are dedicated to guarantee system quality and maintain the system performance. The RRM provides functions including power control, handover, admission control, load control, packet switching, and resource management. However, none of these functions provides an indication of signal coverage for a specific cell location.

Before implementing this invention 10, a baseline road test 20 shall be performed in order to identify the baseline SNR (BSNR) within a wireless communication sector. This baseline SNR is used along with other RRM parameter data 42 that are available on the wireless communication system for the modeling and simulation processes.

The system 10 of this invention includes five (5) modules which are Definition 22, Index 24, Characterizing 26, Modeler 28, and Simulator 30. The detail functions of each module follow.

This invention first analyzes all RRM parameters available from either base station, base station controller (BSC), network management system (NMS), or from a centralized system archives The interfaces of retrieving the RRM parameters is a design issue depending on preferences and configurations of each service carrier.

Once the RRM parameters are collected, the system, by the Definition Module, organizes the collected parameter data according to a predefined vendor-specific definition. Due to different system vendor implementations, the standard RRM parameters may be implemented in different methods or format. Therefore, the Definition Module identifies and defines RRM parameters by the pre-determined vendor-specific definitions. Furthermore, any non-standard RRM parameters that the service carrier deems to be signal-coverage-affecting factors can be defined in the Definition Module.

When the RRM parameters are identified, the Index Module indexes the RRM parameter data. Due to the large amount of RRM parameter data, the Index Module implements multiple-tier indexing methods. The RRM parameters are first indexed by the Replica-Tree indexing method. The amount of data from the first-tier indexing is still considered to be large from the efficiency point-of-view for data access and storage. The Index Module therefore applies a additional tiers indexing methods to the data and associated indices from the first-tier indexing. The multiple-tier indexing methods after the first-tier indexing, in sequence order, include Move-To-Front (MTF) indexing methods, Run-length Indexing method, and Huffman Indexing Method.

The Characterizing Module characterizes each RRM parameter in terms of each parameter's characteristic elements by the following mathematical expression. The process of characterizing RRM parameters is to define the detail influential elements of each RRM parameter.

$$V=\{RRM0, RRM1, RRM2, \ldots RRMq, BSNR\}$$

where BSNR: baseline SNR $RRM_q$: $q^{th}$ number of RRM parameter $V_i \hat{\ } j$: $V_i$ to the jth power; An array of RRM parameters and a baseline SNR $$F_i = \begin{bmatrix} Vi^{\wedge}0 \\ Vi^{\wedge}1 \\ Vi^{\wedge}2 \\ \ldots \\ Vi^{\wedge}j \\ Vi*\sin(R) \\ Vi*\sin(2R) \\ \ldots \\ Vi*\sin(mR) \end{bmatrix}$$

where $F_i$: characterizing array for the $i^{th}$ member in array V $0 \leq i \leq q$ $$M_i=(V_i,t0\ V_i,t1\ V_i,t2 \ldots V_i,tk)$$

where tk: timepoint of k $M_i$: Array of sampling for $RRM_i$ by K samples at different timepoints $$P_i=(F_i,t0\ F_i,t1\ F_i,t2 \ldots F_i,tk)$$

where $P_i$: characterizing array for $RRM_i$ for all k timepoints

The Modeling Module sets a coverage environment model in terms of the RRM parameters for the purpose of simulations. The modeling processes include steps by using the following mathematical expressions.

The first step, by knowing Pan and $M_i$, is to determine the $W_i$ in the following mathematical expression.

$$M_i = W_i * \begin{bmatrix} Pa0 \\ Pa1 \\ Pa2 \\ \ldots \\ Pan \end{bmatrix}$$

Once the $W_i$ is determined, the second step is to determine the $R_i$ in the following mathematical expression.

$$Mi = Wi * \left\{ \begin{bmatrix} Pa0 \\ Pa1 \\ Pa2 \\ ... \\ Pan \end{bmatrix} + Ri \right\}$$

where $M_i$: relationships array representing the relationships between the $RRM_i$ and all other RRM parameters $W_i$: an intermediate factor $P_{an}$: characterizing array for $RRM_{an}$ for all k timepoints $R_i$: probability array for each Pan.

$0 \leq a0 \ldots an \leq q$, and $a0 \ldots an \neq i$ $a0 \neq a1 \neq a2 \neq \ldots \neq an$ Multiple iterations of the above modeling processes are performed in order to eliminate any Pan whose associated probability is less than 0.5 ($R_i < 0.5$).

Upon the RRM parameters' influential probabilities are all within a predetermined requirement, for example, smaller than 0.5, the modeling processes are terminated.

The Simulation Module simulates the RRM parameters' influences among each other by using the following mathematical expressions.

$$C = U * \begin{bmatrix} Fb0 \\ Fb1 \\ Fb2 \\ ... \\ Fbu \\ Fc0 * Fd0 \\ Fc1 * Fd1 \\ ... \\ Fcy * Fdy \\ Fe0 / Ff0 \\ Fe1 / Ff1 \\ ... \\ Fev / Ffv \end{bmatrix}$$

where C: a constant (any number)

$0 \leq b0 \ldots bn \leq q$, and $b0 \ldots bu \neq i$ $c0 \neq c1 \neq \ldots \neq cy$ $d0 \neq d1 \neq \ldots \neq dy$ $e0 \neq e1 \neq \ldots \neq ev$ $f0 \neq f1 \neq \ldots \neq fv$ U: Balancing array to balance the influential RRMs in the communication environment The simulations begins by determining the U array based on the assumption that all influential RRM parameters should balance the signal coverage by adjusting the RRM parameter values itself When the U array is determined, different simulations among the influential RRM parameters may be performed in order to determine the SNR values of the characterizing array (F).

The model with the final list of RRM parameters is a representative model of the communication coverage environment. The SNR reports therefore generated based on the simulations to indicate communication signal coverage.

It is to be understood that the embodiments and variations shown and described herein are merely illustrative of the principles of this invention and that various modifications may be implemented by those skilled in the art without departing from the scope and spirit of the invention.

The invention claimed is:

1. An automatic coverage system for wireless communications, wherein the system includes
   a definition module;
   a modeling module;
      the definition module defines radio resource management parameters;
      the modeling module creates models by first mathematical expressions in terms of the resource management parameters;
   a simulation module;
   a characterizing module;
      the simulation module performs simulations by using radio resource management parameters and a baseline signal-to-noise ratio (SNR) value; and
      the characterizing module defines characterizations of the radio resource management parameters by second mathematical expressions, $V = \{RRM0, RRM1, RRM2, \ldots RRMq, BSNR\}$ where BSNR: baseline SNR $RRM_q$: $q^{th}$ number of RRM parameters $$F_i = \begin{bmatrix} Vi^\wedge 0 \\ Vi^\wedge 1 \\ Vi^\wedge 2 \\ ... \\ Vi^\wedge j \\ Vi * \sin(R) \\ Vi * \sin(2R) \\ ... \\ Vi * \sin(mR) \end{bmatrix}$$

where $V_i \hat{\ } j$: $V_i$ to the $j^{th}$ power; An array of RRM parameters and a baseline SNR $F_i$: characterizing array for the $i^{th}$ member in array V $M_i = (V_i, t0 \; V_i, t1 \; V_i, t2 \ldots V_i, tk)$ where tk: timepoint of k $M_i$: Array of sampling for $RRM_i$ by K samples at different timepoints $P_i = (F_i, t0 \; F_i, t1 \; F_i, t2 \ldots F_i, tk)$ where $P_i$: characterizing array for $RRM_i$ at k timepoints.

2. The automatic coverage system for wireless communications of claim 1, wherein
   the system includes an index module; and
      the index module performs multiple-tier indexing on the radio resource management parameters.

3. The automatic coverage system for wireless communications of claim 2, wherein
   the multiple-tier indexing include Replica-tree indexing method and Move-To-Front (MTF) indexing method and Run-length Indexing method and Huffman Indexing methods.

4. The automatic coverage system for wireless communications of claim 1, wherein
   the first mathematical expressions are, $$M_i = W_i * \left\{ \begin{bmatrix} Pa0 \\ Pa1 \\ Pa2 \\ ... \\ Pan \end{bmatrix} + R_i \right\}$$

where $M_i$: relationships array representing the relationships between the $RRM_i$ and all other RRM parameters
$W_i$: an intermediate factor
$P_{an}$: characterizing array for $RRM_{an}$ for all k timepoints
$R_i$: probability array for each Pan.
$0 \leq a0 ... an \leq q$, and $a0 ... an \neq i$
$a0 \neq a1 \neq a2 \neq ... \neq an$.

5. The automatic coverage system for wireless communications of claim 1, wherein
the simulations are performed in accordance with third mathematical expressions, $$C = U * \begin{bmatrix} Fb0 \\ Fb1 \\ Fb2 \\ ... \\ Fbu \\ Fc0 * Fd0 \\ Fc1 * Fd1 \\ ... \\ Fcy * Fdy \\ Fe0/Ff0 \\ Fe1/Ff1 \\ ... \\ Fev/Ffv \end{bmatrix}$$

where C: a constant (any number)
$0 \leq b0 ... bn \leq q$, and $b0 ... bu \neq i$
$c0 \neq c1 \neq ... \neq cy$
$d0 \neq d1 \neq ... \neq dy$
$e0 \neq e1 \neq ... \neq ev$
$f0 \neq f1 \neq ... \neq fv$
U: Balancing array to balance the influential RRMs in the communication environment.

6. An automatic coverage system for wireless communications, wherein the system includes
a definition module;
an index module;
the definition module defines radio resource management parameters; and
the index module performs multiple-tier indexing on the radio resource management parameters, wherein
the multiple-tier indexing include Replica-tree indexing method and Move-To-Front (MTF) indexing methods and Run-length Indexing methods and Huffman Indexing methods.

7. The automatic coverage system for wireless communications of claim 6, wherein
the system includes a modeling module; and
the modeling module creates models by first mathematical expressions in terms of the resource management parameters.

8. The automatic coverage system for wireless communications of claim 7, wherein the system includes a characterizing module and a simulation module; and
the simulation module performs simulations by using radio resource management parameters and a baseline signal-to-noise ratio (SNR) value; and
the characterizing module defines characterizations of the radio resource management parameters by second mathematical expressions, $V = \{RRM0, RRM1, RRM2, ... RRMq, BSNR\}$ where BSNR: baseline SNR
$RRM_q$: $q^{th}$ number of RRM parameters $$F_i = \begin{bmatrix} V_i\text{\textasciicircum}0 \\ V_i\text{\textasciicircum}1 \\ V_i\text{\textasciicircum}2 \\ ... \\ V_i\text{\textasciicircum}j \\ V_i * \sin(R) \\ V_i * \sin(2R) \\ ... \\ V_i * \sin(mR) \end{bmatrix}$$

where $V_i\hat{\ }j$: $V_i$ to the $j^{th}$ power; An array of RRM parameters and a baseline SNR
$F_i$: characterizing array for the $i^{th}$ member in array V $M_i = (V_i, t0\ V_i, t1\ V_i, t2\ ...\ V_i, tk)$ where tk: timepoint of k
$M_i$: Array of sampling for $RRM_i$ by K samples at different timepoints $P_i = (F_i, t0\ F_i, t1\ F_i, t2\ ...\ F_i, tk)$ where $P_i$: characterizing array for $RRM_i$ at k timepoints.

9. The automatic coverage system for wireless communications of claim 8, wherein
the simulations are performed in accordance with third mathematical expressions $$C = U * \begin{bmatrix} Fb0 \\ Fb1 \\ Fb2 \\ ... \\ Fbu \\ Fc0 * Fd0 \\ Fc1 * Fd1 \\ ... \\ Fcy * Fdy \\ Fe0/Ff0 \\ Fe1/Ff1 \\ ... \\ Fev/Ffy \end{bmatrix}$$

where C: a constant (any number)
$0 \leq b0 ... bn \leq q$, and $b0 ... bu \neq i$
$c0 \neq c1 \neq ... \neq Cy$
$d0 \neq d1 \neq ... \neq dy$
$e0 \neq e1 \neq ... \neq ev$
$f0 \neq f1 \neq ... \neq fv$
U: Balancing array to balance the influential RRMs in the communication environment.

10. An automatic coverage system for wireless communications, wherein
a definition module;
the characterizing module
the definition module defines radio resource management parameters; and
the characterizing module defines characterizations of the radio resource management parameters by second mathematical expressions, V={RRM0, RRM1, RRM2, ... RRMq, BSNR} where BSNR: baseline SNR
$RRM_q$: $q^{th}$ number of RRM parameters $$F_i = \begin{bmatrix} Vi^\wedge 0 \\ Vi^\wedge 1 \\ Vi^\wedge 2 \\ \ldots \\ Vi^\wedge j \\ Vi*\sin(R) \\ Vi*\sin(2R) \\ \ldots \\ Vi*\sin(mR) \end{bmatrix}$$

where $V_i\hat{\ }j$: $V_i$ to the jth power; An array of RRM parameters and a baseline SNR
$F_i$: characterizing array for the $i^{th}$ member in array V $M_i = (V_i, t0\ V_i, t1\ V_i, t2 \ldots V_i, tk)$ where tk: timepoint of k
$M_i$: Array of sampling for $RRM_i$ by K samples at different timepoints $P_i = (F_i, t0\ F_i, t1\ F_i, t2 \ldots F_i, tk)$ where $P_i$: characterizing array for $RRM_i$ at k timepoints.

11. The automatic coverage system for wireless communications of claim 10, wherein
the system includes an index module and a modeling module; and
the modeling module creates models by first mathematical expressions in terms of the resource management parameters; and
the index module performs multiple-tier indexing on the radio resource management parameters.

12. The automatic coverage system for wireless communications of claim 11, wherein
the multiple-tier indexing include Replica-tree indexing method and Move-To-Front (MTF) indexing method and Run-length Indexing method and Huffman Indexing methods.

13. The automatic coverage system for wireless communications of claim 11, wherein the first mathematical expressions are, $$Mi = Wi * \left\{ \begin{bmatrix} Pa0 \\ Pa1 \\ Pa2 \\ \ldots \\ Pan \end{bmatrix} + Ri \right\}$$

where $M_i$: relationships array representing the relationships between the $RRM_i$ and all other RRM parameters
$W_i$: an intermediate factor
$P_{an}$: characterizing array for $RRM_{an}$ for all k timepoints
$R_i$: probability array for each Pan.
$0 \leq a0 \ldots an \leq q$, and $a0 \ldots an \neq i$
$a0 \neq a1 \neq a2 \neq \ldots \neq an$.

14. The automatic coverage system for wireless communications of claim 11, wherein
the system includes a simulation module; and
the simulation module performs simulations by using radio resource management parameters and a baseline signal-to-noise ratio (SNR) value.

15. The automatic coverage system for wireless communications of claim 14, wherein
the simulations are performed in accordance with third mathematical expressions, $$C = U * \begin{bmatrix} Fb0 \\ Fb1 \\ Fb2 \\ \ldots \\ Fbu \\ Fc0*Fd0 \\ Fc1*Fd1 \\ \ldots \\ Fcy*Fdy \\ Fe0/Ff0 \\ Fe1/Ff1 \\ \ldots \\ Fev/Ffv \end{bmatrix}$$

where C: a constant (any number)
$0 \leq b0 \ldots bn \leq q$, and $b0 \ldots bu \neq i$
$c0 \neq c1 \neq \ldots \neq cy$
$d0 \neq d1 \neq \ldots \neq dy$
$e0 \neq e1 \neq \ldots \neq ev$
$f0 \neq f1 \neq \ldots \neq fv$
U: Balancing array to balance the influential RRMs in the communication environment.

* * * * *